Patented Dec. 7, 1937

2,101,107

UNITED STATES PATENT OFFICE 2,101,107

MOLDING COMPOSITIONS AND PROCESS OF MOLDING

Daniel E. Strain, Wilmington, Del., assignor, by mesne assignments, to E. I. du Pont de Nemours & Company, Wilmington, Del., a corporation of Delaware No Drawing. Application April 26, 1935
Serial No. 18,391

16 Claims. (Cl. 18—55)

This invention relates to molding compositions and process of molding same and, more particularly, relates to molding compositions comprising intimate mixtures of polymeric mono-methacrylic acid esters and monomeric poly-methacrylic acid esters, the molding of same, and the molded articles obtained.

Heretofore, polymeric mono-methacrylic acid esters have been molded under heat and pressure but this has been done at temperatures appreciably in excess of the softening temperature of the ultimate molded article. Since these polymeric esters are thermoplastic, it was quite natural that the art should follow this procedure as there was no way of utilizing the ordinary thermo hardening molding technique.

An object of the present invention is to provide polymeric methacrylic acid ester molding compositions which are capable of being readily molded. A further object is to provide methacrylic acid ester molding compositions which can be molded into articles having high softening temperatures. A still further object is to provide methacrylic acid ester compositions capable of being molded by ordinary thermo hardening resin molding technique. A still further object is to provide clear, transparent molded articles comprising a di-methacrylic acid ester.

The above objects are accomplished according to the present invention by intimately admixing a polymeric mono-methacrylic acid ester with a monomeric poly-methacrylic acid ester and molding the resulting composition under pressure.

By polymethacrylic acid ester as used herein is meant a polyhydric alcohol ester of methacrylic acid in which more than one hydroxyl is esterified.

It has been found that, by intimately admixing a polymeric mono-methacrylic acid ester with a monomeric poly-methacrylic acid ester, particularly a monomeric di-methacrylic acid ester, the resulting molding composition can be molded readily and the resulting molded articles possess properties that could not be obtained heretofore with methacrylic acid ester molding compositions.

In general, polymeric mono-methacrylic acid esters can be molded but it has necessarily been the practice heretofore to mold these polymeric esters at temperatures either substantially above, or so close to, the softening point of the ultimate molded article that it was necessary to cool the molds before the articles were ejected, to avoid deformation. Also the molded articles have relatively low softening points and, for some purposes, their hardness and resistance to organic solvents is not sufficient. By admixing a polymeric mono-methacrylic acid ester with a monomeric poly-methacrylic acid ester, a molding composition is obtained which can be readily molded at temperatures well below the softening point of the ultimate molded article so that the molds do not have to be cooled before the articles are ejected. Furthermore, the introduction of the monomeric poly-methacrylic acid ester not only greatly increases the softening point of the molded article but also, depending on the amount of poly-methacrylic acid ester employed, the hardness and resistance to organic solvents of the molded article can be increased as desired.

In order to illustrate the present invention, the following examples are given, parts being by weight:

*Example 1.*—A solution is prepared from 120 grams of glycol di-methacrylate monomer, 1.2 grams of benzoyl peroxide and 1.5 grams of stearic acid. This solution is added to 180 grams of finely divided methyl methacrylate polymer and the composition is mixed for 20 seconds in a "Banbury" mixer. The product is discharged as a soft white dough. This composition is charged into a mold and molded at a temperature of 105–110° C. using a heating period of 5 minutes and pressure of 2000 pounds per square inch. The molded article may be ejected from the mold at the molding temperature without deformation.

*Example 2.*—5 parts of glycol di-methacrylate monomer containing 1% benzoyl peroxide are mixed with 95 parts of finely powdered methyl methacrylate polymer, and the mixture allowed to stand at room temperature for 48 hours. This composition is charged into a die previously heated to 110° C. and pressed under 4000 pounds per square inch pressure for 10 minutes. A molding which softens at 116° C. and which can be ejected from the die without danger of deformation is obtained.

*Example 3.*—25 parts of glycol di-methacrylate monomer containing 1% benzoyl peroxide are stirred into 75 parts of finely powdered methyl methacrylate polymer, and the mixture allowed to stand for 48 hours at room temperature. This composition is charged into a die previously heated to 110° C. and pressed under 2000 pounds per square inch pressure for 7 minutes. A molding which softens at 128° C. and which can be discharged from the die at the molding temperature without danger of deformation is obtained.

*Example 4.*—75 parts of methyl methacrylate polymer are worked into a mixture of 25 parts of glycol di-methacrylate monomer containing 1% benzoyl peroxide and 5 parts of dibutyl phthalate, the mixture charged into a die previously heated to 100° C. and pressed under 2000 pounds per square inch pressure for 10 minutes. A product is obtained which can be discharged from the die at the molding temperature without danger of deformation.

*Example 5.*—To 40 parts of glycol di-methacrylate monomer containing 1% benzoyl peroxide is added 0.01 part of an oil-soluble red dye and the mixture worked until the dye has completely dissolved in the monomer. The dyed monomer is added to 60 parts of methyl methacrylate polymer and the mixture worked until homogeneous, then charged into a die previously heated to 130° C. and pressed at 2000 pounds per square inch pressure for 5 minutes. A clear red product which softens at 137° C. and which suffers no deformation at 130° C. is obtained.

*Example 6.*—25 parts of cyclohexene glycol di-methacrylate monomer containing 1% benzoyl peroxide are stirred into 75 parts of finely powdered methyl methacrylate polymer, and the mixture allowed to stand for 10 hours at room temperature. This composition is charged into a die previously heated to 110° C. and pressed under 2000 pounds per square inch pressure for 7 minutes. A product is obtained which can be discharged from the die at the molding temperature without danger of deformation.

*Example 7.*—4 parts of glycol di-methacrylate monomer containing 1% of benzoyl peroxide are mixed with 3.5 parts of the methyl ester of tetrahydronaphthalene dicarboxylic acids, and the mixture dissolved in ether. To this solution is then added 42.5 parts of methyl methacrylate polymer and the mixture stirred. The ether is then allowed to evaporate, the mixture charged into a die, and molded for 6 minutes at 180° C. under 3000 pounds per square inch pressure. The die is then cooled to about 80° C. and the molding ejected.

*Example 8.*—A mixture of 12.5 parts of glycerol di-methacrylate monomer and 12.5 parts of glycerol trimethacrylate monomer, said mixture containing 1% benzoyl peroxide, is stirred into 75 parts of finely powdered methyl methacrylate polymer, and allowed to stand overnight at room temperature. The composition thus obtained is charged into a die and molded for 7 minutes at 110° C. under 2000 pounds per square inch pressure. An article is obtained which can be discharged from the die at the molding temperature without danger of deformation.

*Example 9.*—25 parts of triethylene glycol di-methacrylate monomer containing 1% benzoyl peroxide are stirred into 75 parts of finely powdered methyl methacrylate polymer, and the mixture allowed to stand overnight at room temperature. This composition is charged into a die and molded 7 minutes at 110° C. under 2000 pounds per square inch pressure. An article is obtained which can be discharged from the die at the molding temperature without danger of deformation.

It will be understood that the above examples are merely illustrative and that the invention may be varied widely. Any other polymeric mono-methacrylic acid ester may be used in place of the particular esters of the examples. It is preferred to employ the methyl, ethyl, propyl, isobutyl, or cyclohexyl ester of methacrylic acid but others may be used such as phenyl methacrylate, methyl, ethyl, and butyl ether of ethylene glycol mono-methacrylate, butyl carbitol methacrylate, dodecyl and octadecyl methacrylate, methacrylyl urea, and methacrylamide, or interpolymers thereof.

Instead of the monomeric poly-methacrylic acid esters used in the examples, any other poly-methacrylic acid ester may be used. Among the monomeric esters suitable for use in the present invention may be mentioned glycol di-methacrylate, cyclohexene glycol di-methacrylate, glyceryl di-methacrylate, glyceryl trimethacrylate, and triethylene glycol di-methacrylate.

The proportion of monomer to polymer used in the present invention will be varied considerably according to the particular result desired. Ordinarily, the proportion of polymer will be in excess and at least 5%, by weight of the polymer, of monomer will be used. However, the effect of a very small proportion of monomeric poly-methacrylic acid ester is quite noticeable and, in certain uses, a proportion of less than 5% is advantageous.

It will be understood that the proportion of monomer employed will be governed to a great extent by the properties desired in the ultimate molded article. By increasing the proportion of monomeric di- or poly-methacrylate, the softening point of the molded article is increased as well as its hardness and resistance to organic solvents. For example, a 5% glycol di-methacrylate monomer-95% methyl methacrylate polymer composition gives a molded article softening at about 116° C., while by increasing the proportion of di-methacrylate monomer to 44% and molding under substantially the same conditions, a molding is obtained which softens at about 180° C. In fact, if the proportion of di-methacrylate monomer is increased sufficiently, a substantially infusible molding can be obtained.

In certain instances, particularly where material having a high viscosity characteristic is employed, appreciably more than 100% by weight of the polymer, of monomer may be used. As will be understood by those skilled in the art, the limiting factor here is the feasibility of handling by molding technique a composition containing a very large percent of liquid monomer.

The monomer and polymer can be admixed in any manner but the admixing should be intimate so that a substantially homogeneous product is obtained. Depending upon the physical form of the polymer and the proportion and characteristics of monomer and polymer, the resulting composition to be molded may vary from a free flowing granular molding compound to a composition which is sticky and gummy and may even be in the form of an extremely viscous liquid, although this latter would be rather unusual. In one form of the invention, the polymer is in granular form and the proportion of monomer added is not so great as to appreciably affect the free flowing property of the polymer. In ordinary molding apparatus it is generally more convenient to work with a free flowing granular compound. The admixing of monomer and polymer may be carried out by simply stirring the monomer in the polymer and allowing the mixture to stand for some time so that the monomer may swell up the polymer. On the other hand, the monomer and polymer may be vigorously mixed in a masticator mixer such as a "Banbury" mixer in order that a completely homogeneous composition may be obtained in a matter of a minute or less. Where the monomer-polymer composition is sticky and gummy, it may be taken from the mixing apparatus and worked on the colloid rolls for a short time and then drawn off in slabs from which blanks of suitable size may be cut and these blanks molded. It will be seen that the particular manner of mixing the monomer and polymer and the particular form in which it is introduced into the molds can be varied through all of the known practice without departing from the spirit of this invention.

As to the molding conditions, the pressure employed is usually between 1000–3000 pounds per square inch, the temperature above 80° C. and as high as 200° C., or more, and the molding cycle from 1–10 or more minutes. Molding conditions will be varied according to the particular composition being molded and the method of molding to be used. Ordinarily, in high speed mass production, the molding cycle should be between 1–10 minutes and the compositions of the present invention require a molding temperature of 80° C., or more, to polymerize the monomer and satisfactorily mold the material within this time cycle, even in the presence of a polymerization catalyst. However, the compositions of the present invention, wherein an appreciable amount of the monomeric poly-methacrylic acid ester is employed, will give a molded article having a softening point appreciably above 80° C. so that the thermo hardening molding technique can be satisfactorily employed with all of the compositions of the present invention, that is, the compositions can be molded at a temperature sufficiently below the softening point of the ultimate molded object to safely permit the ejection of the molded article from the mold without any cooling step.

It is to be understood that, although it is a highly economical procedure to employ a molding temperature with the present compositions below the softening point of the ultimate molded object and thus follow the technique of molding thermo hardening compositions, this invention is not limited to proceeding in that manner as is illustrated in Example 7.

It is not necessary to use a polymerization catalyst in the present process but its use is so advantageous in reducing the time of the molding cycle that it would ordinarily be employed. In the examples, benzoyl peroxide has been used as the polymerization catalyst but other polymerization catalysts can also be used such as barium peroxide, sodium peroxide, ozonides, hydrogen peroxide, peracetic acid, and other peracids.

As will occur to those skilled in the art, the usual auxiliary agents may be incorporated with the monomer-polymer mixtures. Plasticizers may be incorporated into either the monomer or polymer prior to molding, and suitable plasticizers include dibutyl phthalate, tricresyl phosphate, diethyl phthalate, phthalide, triacetin, diacetin, dibutyl tartrate, diamyl succinate, et cetera. Also, pigments may be incorporated such as lithopone, titanium oxide, and the like; fillers as china clay, asbestine, wood flour, and the like; dyes, cellulose derivatives, natural and synthetic resins, and other modifying agents.

When pigments and fillers are used, it is preferred to incorporate these into the polymer-monomer composition by working in an internal type of mixed such as a "Banbury" mixer. However, pigments or fillers may be dispersed in the monomer by grinding in a pebble mill, or the like, and this mixture then worked into the polymer in a Banbury mixer, a Werner-Pfleiderer mixer, or by working on the colloid rolls.

In the specific examples the softening temperatures given have been the temperatures at which a molded chip ⅛" in thickness and 2" in diameter can first be flexed or bent by pressing between the fingers. It is evident that this softening temperature is far above that at which the molded article shows any degree of flow.

The molded article resulting from the process of the present invention contains a plastic component or binder component comprising a homogeneous, continued combination of a polymerized mono-methacrylic acid ester and a polymerized poly-methacrylic acid ester. Where no filler, pigment, or auxiliary agent is used, the molded article will consist entirely of this plastic component which is not a true interpolymer and yet apparently is more than a simple physical mixture of the two polymers as shown by the fact that the two polymers combine so perfectly continuously and homogeneously as to give moldings of great clarity and transparency.

An advantage of the present invention is that it provides a method of obtaining clear transparent moldings from compositions containing di-methacrylates; this was not feasible heretofore. A further advantage is that this invention gives a practical means for raising the softening temperature of monomethacrylic acid ester polymers and also for increasing the hardness and decreasing the solubility in organic solvents of the monomethacrylic acid ester polymers. Furthermore, the present invention provides a practical method of utilizing the ordinary thermo hardening molding technique in the molding of methacrylic acid ester polymers. This is an important advance in the art of molding these esters because it makes it possible for the methacrylic acid esters to compete on the basis of quality with the ordinary thermo hardening resins such as the phenol and urea-formaldehyde condensation products. A still further advantage of the present invention is that the softening point of the ultimate molded article may be varied practically at will by varying the proportion of di-methacrylic acid ester monomer contained in the molding composition; in this way it is quite feasible to suit the product obtained to the need which has not been feasible, if at all possible, heretofore.

As many apparently widely different embodiments of this invention may be made without departing from the spirit and scope thereof, it is to be understood that the invention is not limited to the specific embodiments thereof except as defined in the appended claims.

I claim:

1. Process of molding methacrylic acid esters which comprises intimately admixing a polymeric mono-methacrylic acid ester with a monomeric poly-methacrylic acid ester and molding the resulting composition under pressure and at a temperature of not less than about 80° C. whereby said monomeric poly-methacrylic acid ester is substantially polymerized.

2. Process of molding methacrylic acid esters which comprises intimately admixing a polymeric mono-methacrylic acid ester with a monomeric di-methacrylic acid ester and molding the resulting composition under pressure and at a temperature of not less than about 80° C. whereby said monomeric di-methacrylic acid ester is substantially polymerized.

3. Process of molding methacrylic acid esters which comprises intimately admixing polymeric methyl methacrylate with a monomeric di-methacrylic acid ester and molding the resulting composition under pressure and at a temperature of not less than about 80° C. whereby said monomeric di-methacrylic acid ester is substantially polymerized.

4. Process of molding methacrylic acid esters which comprises intimately admixing polymeric methyl methacrylate with monomeric glycol di-methacrylate and molding the resulting composition under pressure and at a temperature of not less than about 80° C. whereby said glycol di-methacrylate is substantially polymerized.

5. Process of molding methacrylic acid esters which comprises intimately admixing a polymeric mono-methacrylic acid ester with a monomeric di-methacrylic acid ester and molding the resulting composition under pressure and at a temperature lower than the softening temperature of the ultimate molded article.

6. Process of molding methacrylic acid esters which comprises intimately admixing polymeric methyl methacrylate with a monomeric di-methacrylic acid ester and molding the resulting composition under pressure and at a temperature lower than the softening temperature of the ultimate molded article.

7. Process of molding methacrylic acid esters which comprises intimately admixing polymeric methyl methacrylate with monomeric glycol di-methacrylate and molding the resulting composition under pressure and at a temperature lower than the softening temperature of the ultimate molded article.

8. A molding composition comprising an intimate admixture of a polymeric mono-methacrylic acid ester and a monomeric poly-methacrylic acid ester.

9. A molding composition comprising an intimate admixture of a polymeric mono-methacrylic acid ester and a monomeric di-methacrylic acid ester.

10. A molding composition comprising an intimate admixture of a polymeric methyl methacrylate and a monomeric di-methacrylic acid ester.

11. A molding composition comprising an intimate admixture of a polymeric methyl methacrylate and monomeric glycol di-methacrylate.

12. A molded methacrylic acid ester article, said article being obtained by molding an intimate admixture of a polymeric mono-methacrylic acid ester and a monomeric di-methacrylic acid ester under pressure and at a temperature of not less than about 80° C. whereby said monomeric di-methacrylic acid ester is substantially polymerized.

13. A molded article wherein the plastic component comprises a homogeneous, continuous combination of a polymerized mono-methacrylic acid ester and a polymerized poly-methacrylic acid ester.

14. A molded article wherein the plastic component comprises a homogeneous, continuous combination of a polymerized mono-methacrylic acid ester and a polymerized di-methacrylic acid ester.

15. A molded article wherein the plastic component comprises a homogeneous, continuous combination of polymerized methyl methacrylate and a polymerized di-methacrylic acid ester.

16. A molded article wherein the plastic component comprises a homogeneous, continuous combination of polymerized methyl methacrylate and polymerized glycol di-methacrylate.

DANIEL E. STRAIN.